(12) United States Patent
Njemanze et al.

(10) Patent No.: US 7,607,169 B1
(45) Date of Patent: Oct. 20, 2009

(54) USER INTERFACE FOR NETWORK SECURITY CONSOLE

(75) Inventors: Hugh S. Njemanze, Los Altos, CA (US); Rajesh P. Bhatt, San Jose, CA (US)

(73) Assignee: ArcSight, Inc., Cupertino, CA (US)

( * ) Notice: Subject to any disclaimer, the term of this patent is extended or adjusted under 35 U.S.C. 154(b) by 1265 days.

(21) Appl. No.: 10/308,418

(22) Filed: Dec. 2, 2002

(51) Int. Cl.
*G06F 11/00* (2006.01)

(52) U.S. Cl. .......................................... 726/22; 726/23
(58) Field of Classification Search ............. 726/22–25, 726/2
See application file for complete search history.

(56) References Cited

U.S. PATENT DOCUMENTS

| | | | |
|---|---|---|---|
| 4,513,743 | A |   | 4/1985 | Van Arragon et al. |
| 5,431,691 | A |   | 7/1995 | Snell et al. |
| 5,557,742 | A |   | 9/1996 | Smaha et al. |
| 5,717,919 | A |   | 2/1998 | Kodavalla et al. |
| 5,781,108 | A | * | 7/1998 | Jacob et al. .................. 340/552 |
| 5,850,516 | A |   | 12/1998 | Schneier |
| 5,956,404 | A |   | 9/1999 | Schneier et al. |
| 5,974,341 | A |   | 10/1999 | Er et al. |
| 5,977,913 | A | * | 11/1999 | Christ ......................... 342/465 |
| 5,978,475 | A |   | 11/1999 | Schneier et al. |
| 6,069,655 | A | * | 5/2000 | Seeley et al. ................. 348/154 |
| 6,070,244 | A |   | 5/2000 | Orchier et al. |
| 6,134,664 | A |   | 10/2000 | Walker |
| 6,192,034 | B1 |   | 2/2001 | Hsieh et al. |
| 6,275,942 | B1 |   | 8/2001 | Bernhard et al. |
| 6,321,338 | B1 |   | 11/2001 | Porras et al. |
| 6,400,307 | B2 | * | 6/2002 | Fullerton et al. ............... 342/28 |
| 6,405,133 | B1 | * | 6/2002 | Schwinn et al. ................. 702/4 |
| 6,408,391 | B1 |   | 6/2002 | Huff et al. |
| 6,408,404 | B1 |   | 6/2002 | Ladwig |
| 6,473,104 | B1 | * | 10/2002 | Harris ......................... 715/833 |
| 6,473,794 | B1 | * | 10/2002 | Guheen et al. ............... 709/224 |
| 6,484,203 | B1 |   | 11/2002 | Porras et al. |
| 6,542,075 | B2 |   | 4/2003 | Barker et al. |
| 6,549,208 | B2 | * | 4/2003 | Maloney et al. ............. 345/473 |
| 6,567,808 | B1 | * | 5/2003 | Eschelbeck et al. ........... 707/10 |
| 6,574,737 | B1 | * | 6/2003 | Kingsford et al. ............. 726/25 |

(Continued)

FOREIGN PATENT DOCUMENTS

WO WO 02/45315 A2 6/2002

(Continued)

OTHER PUBLICATIONS

ArcSight, "About ArcSight Team," date unknown, [online] [Retrieved on Oct. 25, 2002] Retrieved from the Internet <URL: http://www.arcsight.com/about_team.htm>.

(Continued)

*Primary Examiner*—Hosuk Song
(74) *Attorney, Agent, or Firm*—Fenwick & West LLP

(57) ABSTRACT

A user interface for a network security console associated with multiple network security devices is disclosed. A graphical user interface (GUI) for use with an intrusion detection system, comprises a radar display that is configured to simulate a stream of time-based events chronologically. In addition, one or more playback controls are configured to control the stream during simulation. In further embodiments, the radar display includes a slider configured to allow a user to jump to events that occurred at a user-defined time.

22 Claims, 13 Drawing Sheets

U.S. PATENT DOCUMENTS

| | | | |
|---|---|---|---|
| 6,661,340 B1 * | 12/2003 | Saylor et al. | 340/517 |
| 6,694,362 B1 | 2/2004 | Secor et al. | |
| 6,704,874 B1 | 3/2004 | Porras et al. | |
| 6,708,212 B2 | 3/2004 | Porras et al. | |
| 6,711,615 B2 | 3/2004 | Porras et al. | |
| 6,756,998 B1 * | 6/2004 | Bilger | 715/764 |
| 6,839,850 B1 | 1/2005 | Campbell et al. | |
| 6,871,284 B2 * | 3/2005 | Cooper et al. | 726/1 |
| 6,928,556 B2 | 8/2005 | Black et al. | |
| 6,952,779 B1 * | 10/2005 | Cohen et al. | 726/22 |
| 6,965,313 B1 * | 11/2005 | Saylor et al. | 340/539.18 |
| 6,966,015 B2 | 11/2005 | Steinberg et al. | |
| 6,971,026 B1 * | 11/2005 | Fujiyama et al. | 726/25 |
| 6,988,208 B2 | 1/2006 | Hrabik et al. | |
| 6,993,790 B2 * | 1/2006 | Godwin et al. | 726/4 |
| 7,007,104 B1 * | 2/2006 | Lewis et al. | 709/246 |
| 7,039,953 B2 | 5/2006 | Black et al. | |
| 7,043,727 B2 | 5/2006 | Bennett et al. | |
| 7,089,428 B2 | 8/2006 | Farley et al. | |
| 7,113,090 B1 * | 9/2006 | Saylor et al. | 340/539.18 |
| 7,127,743 B1 | 10/2006 | Khanolkar et al. | |
| 7,159,237 B2 | 1/2007 | Schneier et al. | |
| 7,171,689 B2 | 1/2007 | Beavers | |
| 7,219,239 B1 | 5/2007 | Njemanze et al. | |
| 7,260,844 B1 | 8/2007 | Tidwell et al. | |
| 7,278,160 B2 | 10/2007 | Black et al. | |
| 7,308,689 B2 | 12/2007 | Black et al | |
| 7,333,999 B1 | 2/2008 | Njemanze | |
| 7,340,776 B2 | 3/2008 | Zobel et al. | |
| 7,376,969 B1 | 5/2008 | Njemanze et al. | |
| 2002/0019945 A1 | 2/2002 | Houston et al. | |
| 2002/0066034 A1 * | 5/2002 | Schlossberg et al. | 713/201 |
| 2002/0075170 A1 * | 6/2002 | Schwinn et al. | 340/945 |
| 2002/0099958 A1 | 7/2002 | Hrabik et al. | |
| 2002/0147803 A1 | 10/2002 | Dodd et al. | |
| 2002/0184532 A1 | 12/2002 | Hackenberger et al. | |
| 2003/0084349 A1 | 5/2003 | Friedrichs et al. | |
| 2003/0093514 A1 | 5/2003 | Valdes et al. | |
| 2003/0093692 A1 | 5/2003 | Porras | |
| 2003/0101358 A1 | 5/2003 | Porras et al. | |
| 2003/0188189 A1 | 10/2003 | Desai et al. | |
| 2003/0221123 A1 | 11/2003 | Beavers | |
| 2004/0010718 A1 | 1/2004 | Porras et al. | |
| 2004/0024864 A1 | 2/2004 | Porras et al. | |
| 2004/0044912 A1 | 3/2004 | Connary et al. | |
| 2004/0049577 A1 * | 3/2004 | Imhof | 709/224 |
| 2004/0137915 A1 * | 7/2004 | Diener et al. | 455/456.1 |
| 2004/0221191 A1 | 11/2004 | Porras et al. | |
| 2005/0027845 A1 | 2/2005 | Secor et al. | |
| 2005/0204404 A1 | 9/2005 | Hrabik et al. | |
| 2005/0251860 A1 | 11/2005 | Saurabh et al. | |
| 2006/0069956 A1 | 3/2006 | Steinberg et al. | |
| 2006/0212932 A1 | 9/2006 | Patrick et al. | |
| 2007/0118905 A1 | 5/2007 | Morin et al. | |
| 2007/0136437 A1 | 6/2007 | Shankar et al. | |
| 2007/0150579 A1 | 6/2007 | Morin et al. | |
| 2007/0162973 A1 | 7/2007 | Schneier et al. | |
| 2007/0169038 A1 | 7/2007 | Shankar et al. | |
| 2007/0234426 A1 | 10/2007 | Khanolkar et al. | |
| 2007/0260931 A1 | 11/2007 | Aguilar-Macias et al. | |
| 2008/0104046 A1 | 5/2008 | Singla et al. | |
| 2008/0104276 A1 | 5/2008 | Lahoti et al. | |
| 2008/0162592 A1 | 7/2008 | Huang et al. | |
| 2008/0165000 A1 | 7/2008 | Morin et al. | |

FOREIGN PATENT DOCUMENTS

| | | |
|---|---|---|
| WO | WO 02/060117 A1 | 8/2002 |
| WO | WO 02/078262 A1 | 10/2002 |
| WO | WO 02/101988 A2 | 12/2002 |
| WO | WO 2003/009531 A2 | 1/2003 |
| WO | WO 2004/019186 A2 | 3/2004 |

OTHER PUBLICATIONS

ArcSight, "About Overview," Oct. 14, 2002, [online] [Retrieved on Apr. 21, 2006] Retrieved from the Internet <URL: http://web.archive.org/web/20021014041614/http://www.arcsight.com/about.htm>.

ArcSight, "Contact Info," date unknown, [online] [Retrieved on Oct. 25, 2002] Retrieved from the Internet <URL: http://www.arcsight.com/contact.htm>.

ArcSight, "Enterprise Coverage: Technology Architecture," date unknown, [online] Retrieved from the Internet <URL: http://www.snaiso.com/Documentation/Arcsight/arcsight_archdta.pdf>.

ArcSight, "Managed Process: ArcSight Reporting System," date unknown, [online] Retrieved from the Internet <URL: http://www.snaiso.com/Documentation/Arcsight/arcsight_reportsys.pdf>.

ArcSight, "Managed Process: Console-Based Management," date unknown, [online] Retrieved from the Internet <URL: http://www.snaiso.com/Documentation/Arcsight/arcsight_console.pdf >.

ArcSight, "Precision Intelligence: SmartRules™ and Cross-Correlation," date unknown, [online] Retrieved from the Internet <URL: http://www.snaiso.com/Documentation/Arcsight/arcsight_correlation.pdf>.

ArcSight, "Precision Intelligence: SmartAgent™," date unknown, [online] Retrieved from the Internet <URL: http://www.ossmanagement.com/SmartAgent.pdf>.

ArcSight, "Product Info: Product Overview and Architecture," date unknown, [online] [Retrieved on Oct. 25, 2002] . Retrieved from the Internet <URL: http://www.arcsight.com/product.htm>.

ArcSight, "Product Info: 360° Intelligence Yields Precision Risk Management," date unknown, [online] [Retrieved on Oct. 25, 2002] Retrieved from the Internet <URL: http://www.arcsight.corn/product_info01htm>.

ArcSight, "Product Info: ArcSight SmartAgents," Oct. 10, 2002, [online] [Retrieved on Apr. 21, 2006] Retrieved from the Internet <URL:http://web.archive.org/web/20021010135236/http://www.arcsight.com/product_info02.htm>.

ArcSight, "Product Info: ArcSight Cross-Device Correlation," date unknown, [online] [Retrieved on Oct. 25, 2005] Retrieved from the Internet <URL:http://wvw.arcsight.com/product_info03.htm>.

ArcSight, "Product Info: ArcSight Manager," date unknown, [online] [Retrieved on Oct. 25, 2002] Retrieved from the Internet <URL: http://www.arcsight.com/product_info04.htm>.

ArcSight, "Product Info: ArcSight Console," date unknown, [online] [Retrieved. on Nov. 15, 2002] Retrieved from the Internet <URL: http:www.arcsight.com/product_into05.htm>.

ArcSight, "Product Info: ArcSight Reporting System," date unknown, [online] [Retrieved on Oct. 25, 2002] Retrieved from the Internet <URL: http:www.arcsight.com/product_info06.htm>.

ArcSight, "Product Info: Enterprise Scaling," date unknown, [online] [Retrieved on Oct. 25, 2002] Retrieved from the Internet <URL: http://www.arcsight.com/product_info07.htm>.

ArcSight, "Security Management for the Enterprise," 2002, [online] [Retrieved on Oct. 25, 2002] Retrieved from the Internet <URL: http:www.arcsight.com/>.

ArcSight, "Technical Brief: How Correlation Eliminates False Positives," date unknown, source unknown.

Burleson, D., "Taking Advantage of Object Partitioning in OracleBi," Nov. 8, 2000, [online] [Retrieved on Apr. 20, 2004] Retrieved from the Internet <URL: http://www.dba-oracle.com/art_partit.htm>.

Derodeff, C. "Got Correlation? Not Without Normalization," 2002, [online] Retrieved from the Internet <URL: http://www.svic.com/papers/pdf/Got-Correlation_normalization.pdf>.

Cheung, S. et al., "Emerald Intrusion Incident Report 601 Message Specification," Aug. 10, 2000, System Design Laboratory, SRI International.

National Institute of Standards and Technology (NIST). "Federal lnforrmation Processing Standards Publication (FIPS Pub) 199: Standards for Security Categorization of Federal Information and Information Systems", Feb. 2004.

Haley Enterprise, "Production Systems," 2002, [online] [Retrieved on Oct. 29, 2002] Retrieved from the Internet <URL: http://www.haley.com/0072567836705810/ProductionSystems.html>.

Haley Enterprise, "The Rete Algorithm," 2002, [online] [Retrieved on Oct. 29, 2002] Retrieved from the Internet <URL: http://www.haley.com/0072567836705810/ReteAlgorithm.html>.

Haley Enterprise, "A Rules Engine for Java Based on the Rete Algorithm," 2002, [online] [Retrieved on Oct. 29, 2002] Retrieved from the Internet <URL: http://www.haley.com/0072567836705810/ReteAlgorithmForRules.html>.

Halme, L.R. et al., "Aint Misbehaving: A Taxonomy of Anti-Intrusion Techniques," 2000, [online] [Retrieved on Nov. 1, 2002] Retrieved from the Internet <URL: http://www.sans.org/newlook/resources/IDFAQ/aint.htm>.

Lindqvist, U. et al., "Detecting Computer and Network Misuse Through the Production-Based Expert System Toolset (P-Best)," Proceedings of the IEEE Symposium on Security and Privacy, Oakland, California, May 9-12, 1999.

Cert Coordination Center, "Overview of Attack Trends." 2002, [online] Retrieved from the Internet <URL: http://www.cert.org/archive/pdf/attack_trends.pdf>.

Porras, P.A. et al., "Emerald: Event Monitoring Enabling Responses to Anomalous Live Disturbances," Oct. 1997, Proceedings of the 20$^{th}$ NIST-NCSC National Information Systems Security (NISS) Conference.

Porras, P.A. et al., "A Mission-Impact-Based Approach to INFOSEC Alarm Correlation," Oct. 2002, Lecture Notes in Computer Science, Proceedings: Recent Advances in Intrusion Detection, pp. 95-114, Zurich, Switzerland.

Ingargiola, G:, "The Rete Algorithm," date unknown, [online] [Retrieved on Oct. 29, 2002] Retrieved from the Internet <URL.: http://yoda.cis.temple.edu:8080/UGAIWWW/lectures/rete.html>.

Bruneau, G., "What Difficulties are Associated on Matching Events with Attacks. Why is Event/Data Correlation Important?," 2001, [online] [Retrieved on Nov. 1, 2002] Retrieved from the Internet <URL: http://www.sans.org/newlook/resources/IDFAQ/matching.htm>.

National Institutes of Health (NIH), "Table 1: Security Categorization of Federal Information and Information Systems," revised Jul. 8, 2005, [online] [retrieved on Apr. 6, 2006] Retrieved from the Internet <URL: http://irm.cit.nih.gov/security/table.1htm>.

Wood, M., et al., "Internet-Draft: Intrusion Detection Message Exchange Requirements," Jun. 23, 2002, [online] [Retrieved on Nov. 1, 2002] Retrieved from the Internet <URL: http://www.silicondefense.com/idwg/draft-ietf-idwg-requirements-07.txt>.

U.S. Appl. No. 60/405,921, filed Aug. 26, 2002, Gisby et al.

Heberlein, L. T., et al., "A Method to Detect Intrusive Activity in a Networked Environment," Proceedings of the Fourteenth National Computer Security Conference, NIST/NCSC, Oct. 1-4, 1991, Washington, D.C., pp. 362-371.

Javitz, H. S., et al., "The NIDES Statistical Component Description and Justification," SRI Project 3131, Contract N00039-92-C-0015, Annual Report, A010, Mar. 7, 1994.

Jou, Y. F., et al., "Architecture Design of a Scalable Intrusion Detection System for the Emerging Network Infrastructure," MCNC, Technical Report CDRL A005, Apr. 1997.

Porras, P. A., et al., "Live Traffic Analysis of TCP/IP Gateways," Symposium on Networks and Distributed Systems Security, Internet Society, Mar. 1998.

Robinson, S. L., "Memorandum Opinion" In *SRI International, Inc. v. Internet Security Systems, Inc. and Symantec Corporation* (D. Del., Civ. No. 04-1199-SLR), Oct. 17, 2006.

Valdes, A., et al., "Statistical Methods for Computer Usage Anomaly Detection Using NIDES (Next-Generation Intrusion Detection Expert System)," Proceedings of the Third International Workshop on Rough Sets and Soft Computing (RSSC 94), Jan. 27, 1995, San Jose, CA, pp. 306-311.

U.S. Appl. No. 10/308,767, filed Dec. 2, 2002.
U.S. Appl. No. 10/308,548, filed Dec. 2, 2002.
U.S. Appl. No. 10/308,941, filed Dec. 2, 2002.
U.S. Appl. No. 10/308,416, filed Dec. 2, 2002.
U.S. Appl. No. 10/308,417, filed Dec. 2, 2002.
U.S. Appl. No. 10/308,584, filed Dec. 2, 2002.
U.S. Appl. No. 10/733,073, filed Dec. 10, 2003.
U.S. Appl. No. 10/713,471, filed Nov. 14, 2003.
U.S. Appl. No. 10/683,221, filed Oct. 10, 2003.
U.S. Appl. No. 10/683,191, filed Oct. 10, 2003.
U.S. Appl. No. 10/821,459, filed Apr. 9, 2004.
U.S. Appl. No. 10/839,563, filed May 4, 2004.
U.S. Appl. No. 10/976,075, filed Oct. 27, 2004.
U.S. Appl. No. 10/975,962, filed Oct. 27, 2004.
U.S. Appl. No. 10/974,105, filed Oct. 27, 2004.
U.S. Appl. No. 11/029,920, filed Jan. 4, 2005.
U.S. Appl. No. 11/021,601, filed Dec. 23, 2004.
U.S. Appl. No. 11/070,024, filed Mar. 1, 2005.
U.S. Appl. No. 11/740,203, filed Apr. 25, 2007.
U.S. Appl. No. 11/836,251, filed Aug. 9, 2007.
U.S. Appl. No. 12/098,322, filed Apr. 4, 2008.
U.S. Appl. No. 11/023,942, filed Dec. 24, 2004, pp. 1-26.

* cited by examiner

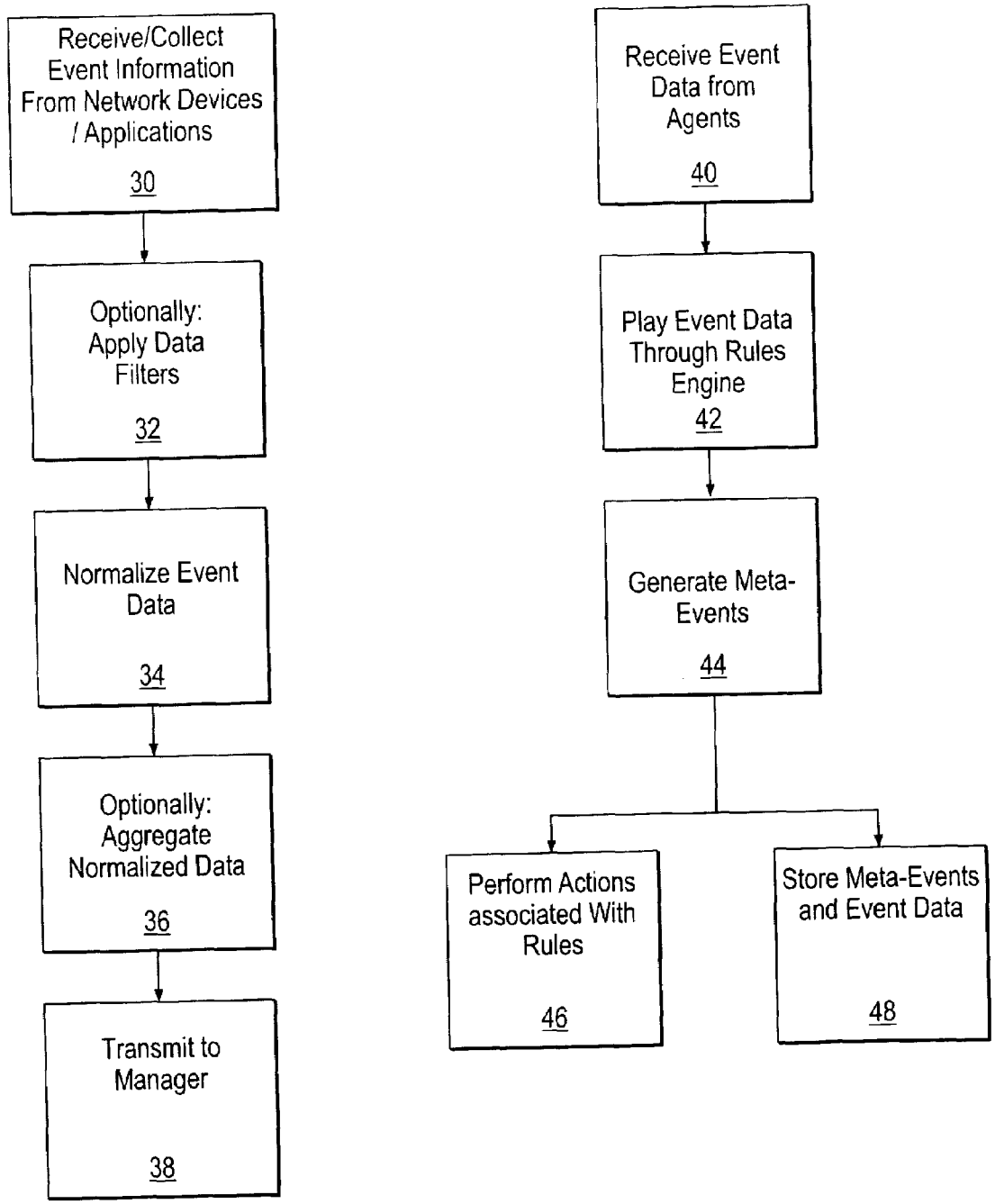

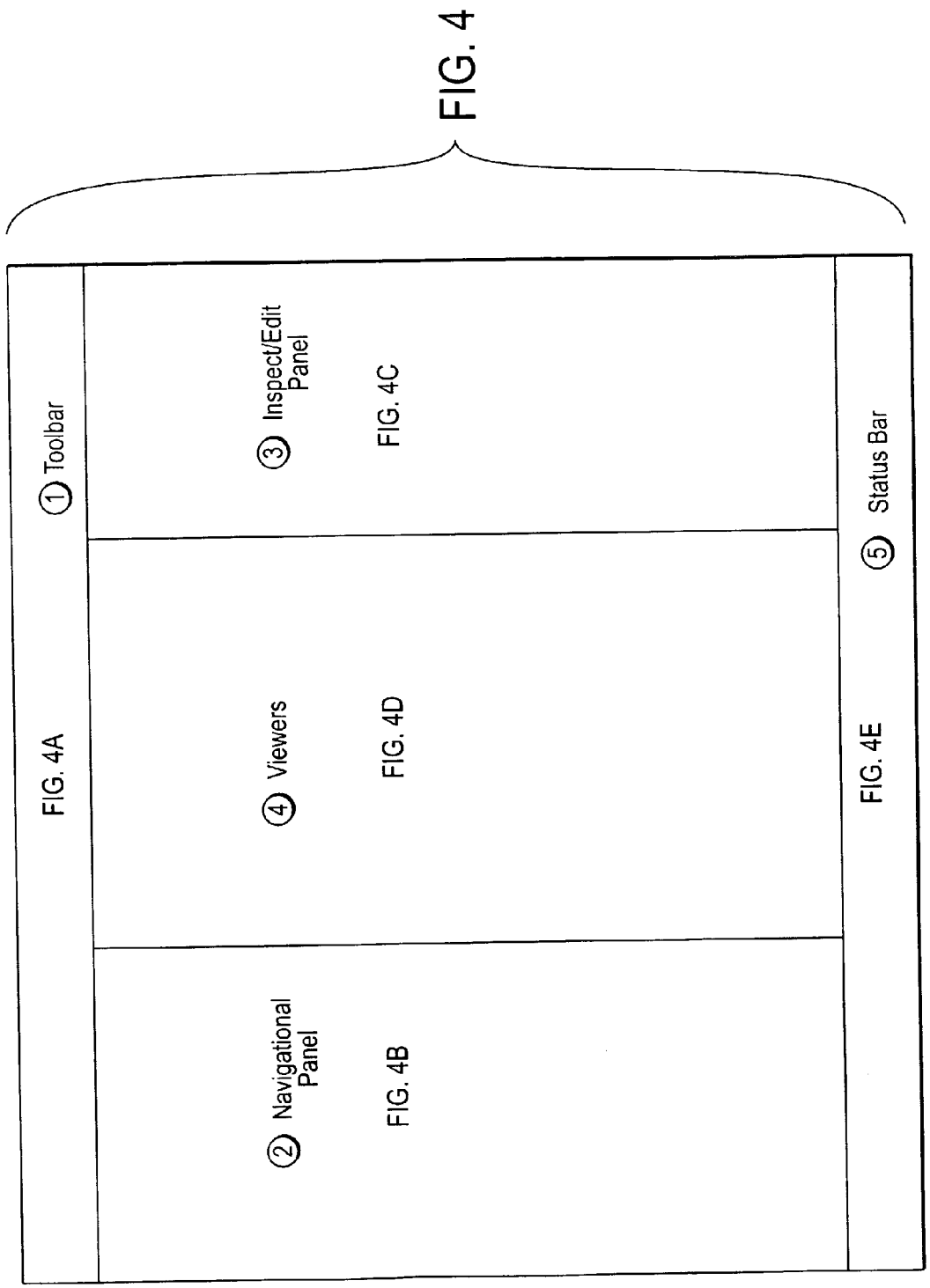

| Detect Time | Classification Name | Source Node Address | Target Address |
|---|---|---|---|
| 11 Oct 2001 22:58:52 PDT | Too Many Bad Logins | 65.108.82.42 | 10.0.111.98 |
| 11 Oct 2001 22:58:52 PDT | Failed Login | 65.108.82.42 | 10.0.111.98 |
| 11 Oct 2001 22:58:52 PDT | Failed Login | 65.108.82.42 | 10.0.111.98 |
| 11 Oct 2001 22:58:51 PDT | Failed Login | 65.108.82.42 | 10.0.111.98 |
| 11 Oct 2001 22:58:51 PDT | Failed Login | 65.108.82.42 | 10.0.111.98 |
| | | | |
| 11 Oct 2001 22:58:51 PDT | Distributed DoS attack | 110.1.1.33 | 110.1.1.04 |
| 11 Oct 2001 22:58:51 PDT | Distributed DoS attack | 110.1.1.33 | 110.1.1.04 |
| 11 Oct 2001 22:58:51 PDT | Distributed DoS attack | 110.1.1.33 | 110.1.1.04 |
| 11 Oct 2001 22:58:51 PDT | Distributed DoS attack | 110.1.1.33 | 110.1.1.04 |
| 11 Oct 2001 22:58:50 PDT | Echo Service | 110.1.1.33 | 110.1.1.04 |
| 11 Oct 2001 22:58:50 PDT | Echo Service | 110.1.1.33 | 110.1.1.04 |
| 11 Oct 2001 22:58:50 PDT | Echo Service | 110.1.1.33 | 110.1.1.04 |
| 11 Oct 2001 22:58:50 PDT | Echo Service | 110.1.1.33 | 110.1.1.04 |

FIG. 6

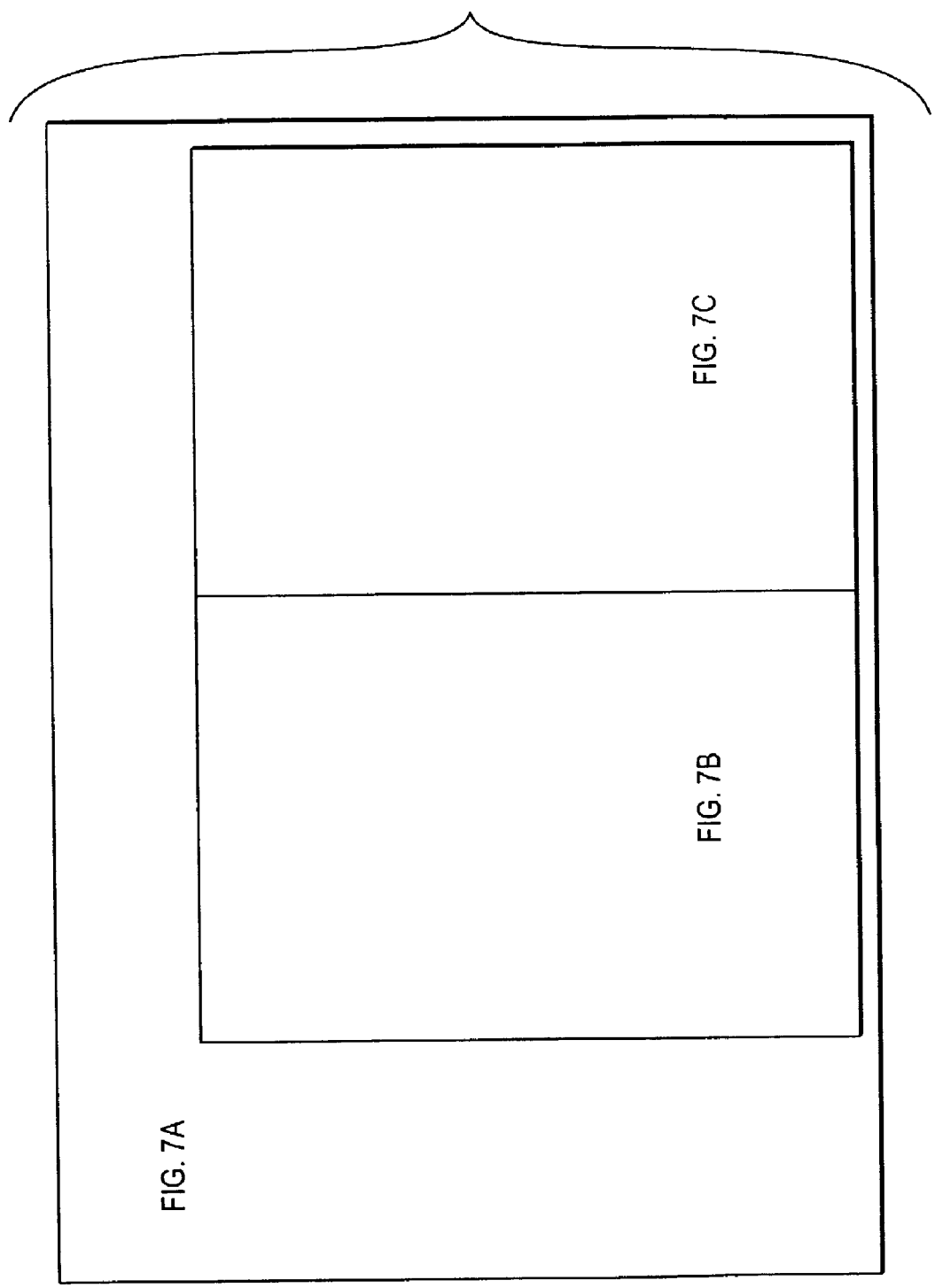

USER INTERFACE FOR NETWORK SECURITY CONSOLE

FIELD OF THE INVENTION

The present invention relates to a computer-based system for capturing, normalizing, and cross-correlating security events from heterogeneous sources. More specifically, included in the system is a user interface for a network security console.

BACKGROUND

Computer networks and systems have become indispensable tools for modern business. Today terabits of information on virtually every subject imaginable are stored in and accessed across such networks by users throughout the world. Much of this information is, to some degree, confidential and its protection is required. Not surprisingly then, intrusion detection systems (IDS) have been developed to help uncover attempts by unauthorized persons and/or devices to gain access to computer networks and the information stored therein.

Intrusion detection may be regarded as the art of detecting inappropriate, incorrect or anomalous activity within or concerning a computer network or system. The most common approaches to intrusion detection are statistical anomaly detection and pattern-matching detection. IDS that operate on a host to detect malicious activity on that host are called host-based IDS (and may exist in the form of host wrappers/personal firewalls or agent-based software), and those that operate on network data flows are called network-based IDS. Host-based intrusion detection involves loading software on the system (the host) to be monitored and using log files and/or the host's auditing agents as sources of data. In contrast, a network-based intrusion detection system monitors the traffic on its network segment and uses that traffic as a data source. Packets captured by the network interface cards are considered to be of interest if they match a signature.

Regardless of the data source, there are two complementary approaches to detecting intrusions: knowledge-based approaches and behavior-based approaches. Almost all IDS tools in use today are knowledge-based. Knowledge-based intrusion detection techniques involve comparing the captured data to information regarding known techniques to exploit vulnerabilities. When a match is detected, an alarm is triggered. Behavior-based intrusion detection techniques, on the other hand, attempt to spot intrusions by observing deviations from normal or expected behaviors of the system or the users (models of which are extracted from reference information collected by various means). When a suspected deviation is observed, an alarm is generated.

Advantages of the knowledge-based approaches are that they have the potential for very low false alarm rates, and the contextual analysis proposed by the intrusion detection system is detailed, making it easier for a security officer using such an intrusion detection system to take preventive or corrective action. Drawbacks include the difficulty in gathering the required information on the known attacks and keeping it up to date with new vulnerabilities and environments.

Advantages of behavior-based approaches are that they can detect attempts to exploit new and unforeseen vulnerabilities. They are also less dependent on system specifics. However, the high false alarm rate is generally cited as a significant drawback of these techniques and because behaviors can change over time, the incidence of such false alarms can increase.

Regardless of whether a host-based or a network-based implementation is adopted and whether that implementation is knowledge-based or behavior-based, an intrusion detection system is only as useful as its ability to discriminate between normal system usage and true intrusions (accompanied by appropriate alerts). If intrusions can be detected and the appropriate personnel notified in a prompt fashion, measures can be taken to avoid compromises to the protected system. Otherwise such safeguarding cannot be provided. Accordingly, what is needed is a system that can provide accurate and timely intrusion detection and alert generation so as to effectively combat attempts to compromise a computer network or system.

SUMMARY OF THE INVENTION

In one embodiment, the present invention provides a user interface for a network security console associated with multiple network security devices. A graphical user interface (GUI) for use with an intrusion detection system, comprises a radar display that is configured to simulate a stream of time-based events chronologically. In addition, one or more playback controls are configured to control the stream during simulation. In further embodiments, the radar display includes a slider configured to allow a user to jump to events that occurred at a user-defined time.

BRIEF DESCRIPTION OF THE DRAWINGS

The present invention is illustrated by way of example, and not limitation, in the figures of the accompanying drawings in which:

FIG. 2 illustrates procedures followed by an agent configured in accordance with an embodiment of the present invention when collecting, normalizing and reporting security event data;

FIG. 3 illustrates procedures followed by a manager configured in accordance with an embodiment of the present invention when analyzing security event data and generating alerts based thereon;

FIG. 6 illustrates one embodiment of a views panel, that is a grid display in accordance with the present invention.

DETAILED DESCRIPTION

Figure 1:
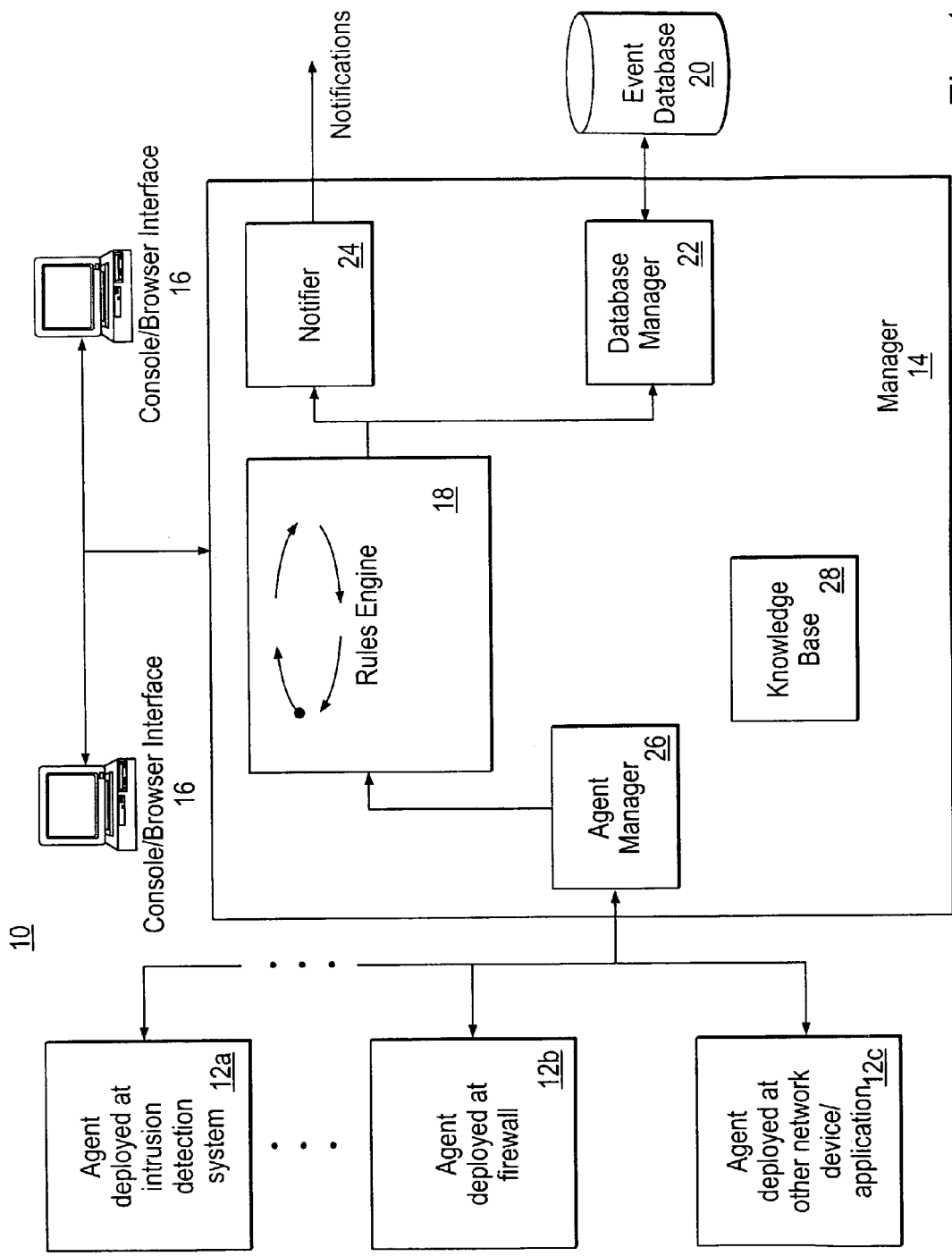
FIG. 1 illustrates one embodiment of a computer-based system for capturing, normalizing and reporting security events from heterogeneous sources configured in accordance with the present invention.

Described herein is a computer-based system for capturing security events from heterogeneous sources, normalizing such events to a common schema and cross-correlating such normalized events with rules to create meta-events. The system (one embodiment of which is manifest as computer software), enables aggregation, correlation, detection, and investigative tracking of suspicious network activities from multiple security devices. The present system also includes a user interface for a network security console associated with the heterogeneous sources. A graphical user interface (GUI) for use with an intrusion detection system includes a radar display that is configured to simulate a stream of time-based events chronologically. In addition, one or more playback controls are configured to control the stream during simulation. In further embodiments, the radar display includes a slider configured to allow a user to jump to events that occurred at a user-defined time.

Although the present system will be discussed with reference to various illustrated examples, these examples should not be read to limit the broader spirit and scope of the present invention. For example, the examples presented herein describe distributed agents, managers and consoles, which are but one embodiment of the present invention. The general concepts and reach of the present invention are much broader and may extend to any computer-based or network-based security system. Also, examples of the messages that may be passed to and from the components of the system and the data schemas that may be used by components of the system are given in an attempt to further describe the present invention, but are not meant to be all-inclusive examples and should not be regarded as such.

Some portions of the detailed description that follows are presented in terms of algorithms and symbolic representations of operations on data within a computer memory. These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

As indicated above, one embodiment of the present invention is instantiated in computer software, that is, computer readable instructions, which, when executed by one or more computer processors/systems, instruct the processors/systems to perform the designated actions. Such computer software may be resident in one or more computer readable media, such as hard drives, CD-ROMs, DVD-ROMs, read-only memory, read-write memory and so on. Such software may be distributed on one or more of these media, or may be made available for download across one or more computer networks (e.g., the Internet). Regardless of the format, the computer programming, rendering and processing techniques discussed herein are simply examples of the types of programming, rendering and processing techniques that may be used to implement aspects of the present invention. These examples should in no way limit the present invention, which is best understood with reference to the claims that follow this description.

Referring now to FIG. 1, an example of a computer-based system 10 architected in accordance with an embodiment of the present invention is illustrated. System 10 includes agents 12, one or more managers 14 and one or more consoles 16 (which may include browser-based versions thereof). In some embodiments, agents, managers and/or consoles may be combined in a single platform or distributed in two, three or more platforms (such as in the illustrated example). The use of this multi-tier architecture supports scalability as a computer network or system grows.

Agents 12 are software programs that provide efficient, real-time (or near real-time) local event data capture and filtering from a variety of network security devices and/or applications. The primary sources of security events are common network elements including firewalls, intrusion detection systems and operating system logs. Agents 12 can collect events from any source that produces event logs or messages and can operate at the native device, at consolidation points within the network, and/or through simple network management protocol (SNMP) traps.

Managers 14 are server-based components that further consolidate, filter and cross-correlate events received from the agents, employing a rules engine 18 and a centralized event database 20. One role of manager 14 is to capture and store all of the real-time and historic event data to construct (via database manager 22) a complete, enterprise-wide picture of security activity. The manager 14 also provides centralized administration, notification (through one or more notifiers 24), and reporting, as well as a knowledge base 28 and case management workflow. The manager 14 may be deployed on any computer hardware platform and one embodiment utilizes a relational database management system such as an Oracle™ database to implement the event data store component. Communications between manager 14 and agents 12 may be bi-directional (e.g., to allow manager 14 to transmit commands to the platforms hosting agents 12) and encrypted. In some installations, managers 14 may act as concentrators for multiple agents 12 and can forward information to other managers (e.g., deployed at a corporate headquarters).

Consoles 16 are computer- (e.g., workstation, handheld, laptop, etc.-) based applications that allow security professionals to perform day-to-day administrative and operation tasks such as event monitoring, rules authoring, incident investigation and reporting. Access control lists allow multiple security professionals to use the same system and event database, with each having their own views, correlation rules, alerts, reports and knowledge base appropriate to their responsibilities. A single manager 14 can support multiple consoles 16.

In some embodiments, a browser-based version of the console 16 may be used to provide access to security events, knowledge base articles, reports, notifications and cases. That is, the manager 14 may include a web server component accessible via a web browser hosted on a personal or handheld computer (which takes the place of console 16) to provide some or all of the functionality of a console 16. Browser access is particularly useful for security professionals that are away from the consoles 16 and for part-time users. Communication between consoles 16 and manager 14 is bi-directional and may be encrypted.

Through the above-described architecture the present invention can support a centralized or decentralized environment. This is useful because an organization may want to implement a single instance of system 10 and use an access control list to partition users. Alternatively, the organization may choose to deploy separate systems 10 for each of a number of groups and consolidate the results at a "master" level. Such a deployment can also achieve a "follow-the-sun" arrangement where geographically dispersed peer groups collaborate with each other by passing primary oversight responsibility to the group currently working standard business hours. Systems 10 can also be deployed in a corporate hierarchy where business divisions work separately and support a rollup to a centralized management function.

Examining each of the various components in further detail, we begin with the agents 12. Agents 12 are used to collect, reduce and normalize the enormous amount of data that is generated by a network's security devices before a manager 14 acts on the data. As will become evident, this process goes beyond simple log consolidation. Before presenting those details, however, and to understand why such measures are desirable, some background regarding how analysts currently cope with security event information generated by multiple network devices is useful.

Conventional intrusion detection systems can help an analyst detect an attack directed at a network resource such as a server. Usually, such investigations are launched in response to an alert generated by the IDS. As a first step after receiving such an alert, an analyst might review perimeter router logs to see if a router associated with the network passed a packet that triggered the alert. If such a packet were discovered, the analyst would likely then want to review one or more firewall logs to see if any existing filters blocked the suspect packet.

Assume, for the sake of this example, the suspect packet got past any firewalls; further investigation would be necessary to determine whether the integrity of the server itself was compromised. Such an integrity check may be performed using a conventional software application such as Tripwire, which is a file integrity checker employing MD5 checksums, to see which files, if any, had been accessed or modified. Finally, the analyst may have to examine a Syslog or an EventLog from the subject server, as well as any tcpdump data collected by a dedicated tcpdump host, for the segment of time surrounding the attack to determine what actually happened.

By this time the analyst has accessed many different systems and looked at several different types of logs in an effort to distill a comprehensive view of the attack. This can be a significant amount of work, and time taken in such review and analysis is time lost from the vitally important tasks of securing the network and restoring the compromised server to make sure that no other systems will be affected. The present invention helps to minimize the time spent on such analysis by consolidating all the relevant information in a single logging facility, allowing the analyst to look at the data in whatever sequence or depth he or she requires.

More than just consolidation, though, the present agents 12 provide data normalization, which is of great benefit when an analyst must deal with security incidents in a heterogeneous network environment. To understand why normalization is helpful consider a typical enterprise environment, which consists of many different types of network devices ranging from border routers and VPN devices, to firewalls and authentication servers, and a wide range of application servers such as web servers, e-mail servers and database servers. Each of these devices generates logs that, as described above, are sources of data to a security analyst. However, it is seldom, if ever, the case that two manufactures will use the same event logging mechanism or format their event logs identically. For example a Cisco Systems PIX™ firewall will not report an accepted packet in the same way as a Check Point firewall or even in the same fashion as a Cisco Systems router.

An example of the types of various reports that might be generated by different network devices is presented below in Table 1, which shows examples of logs from different network devices, each reporting the same packet traveling across a network. In particular, these logs represent a remote printer buffer overflow that connects to IIS servers over port 80.

TABLE 1

Examples of Event Logs for Different Network Devices.

| Network Device | Event Log |
| --- | --- |
| Check Point firewall | "14" "21Dec2001" "12:10:29" "eth-s1p4c0" "ip.of.firewall" "log" "accept" "www-http" "65.65.65.65" "10.10.10.10" "tcp" "4" "1355" " " " " " " " " " " " " " " " " "firewall" " len 68" |
| Cisco Systems router | Dec 21 12:10:27: %SEC-6-IPACCESSLOGP: list 102 permitted tcp 65.65.65.65(1355) -> 10.10.10.10(80), 1 packet |
| Cisco Systems PIX firewall | Dec 21 2001 12:10:28: %PIX-6-302001: Built inbound TCP connection 125891 for faddr 65.65.65.65/1355 gaddr 10.10.10.10/80 laddr 10.0.111.22/80 |
| Snort | [] [1:971:1] WEB-IIS ISAPI .printer access [] [Classification: Attempted Information Leak] [Priority: 3] 12/21-12:10:29.100000 65.65.65.65:1355 -> 10.10.10.10:80 TCP TTL:63 TOS:0x0 ID:5752 IpLen:20 DgmLen: 1234 DF *AP* Seq: 0xB13810DC Ack: 0xC5D2E066 Win: 0x7D78 TcpLen: 32 TCP Options (3) => NOP NOP TS: 493412860 0 [Xref => http://cve.mitre.org/cgi-bin/cvename.cgi?name=CAN-2001-0241] [Xref => http://www.whitehats.com/info/IDS533] |

The Check Point record contains the following fields: event id, date, time, firewall interface, IP address of the firewall interface, logging facility, action, service, source IP, target IP, protocol, source port, some Check Point specific fields and then the size of the datagram. This report is, to say the least, difficult for a human analyst to read (especially with all the empty fields that are represented by double quotes). The Cisco router has a different format: date, time, logging facility, event name, source IP, source port, target address, target port, and number of packets. The Cisco PIX firewall, which is produced by the same manufacturer as the router, uses yet another format: date, time, event name, source IP, source port, translated address or target address, target port, local address, and local port.

The final record is a Snort alert that claims this traffic was malicious. Snort is a well-known IDS and the fields it populates are: exploit or event name, classification, priority, date, time, source IP, source port, target IP, target port, protocol, TTL (time to live), type of service, ID, IP length, datagram length, tcp flags, sequence number, acknowledgement number, window size, and tcp length. Snort also reports additional data such as references to investigate the exploit.

Agents 12 may be deployed in connection with some or all of these (and other) network components and applications. For example, in FIG. 1, agent 12a is deployed in connection with an IDS (such as Snort). Agent 12b is deployed in connection with a firewall (such as the Check Point firewall and/or the Cisco PIX firewall). Agent 12c is deployed in connection with other network components or agents (e.g., a router). Each of these agents receives the event information from its associated network device or application in that device's or application's native format and converts (or normalizes) the information to a common schema. This normalization allows for later storage of the event information in a format that can more readily be utilized by an analyst.

Many normalized schemas can be used and, in general, choosing the fields of a common schema may be based on content rather than semantic differences between device logs and/or manufacturers. To accomplish this normalization, agents 12 are equipped with a parser configured to extract values from the events as reported by the individual network devices/applications and populate the corresponding fields in the normalized schema. Table 2 is an example of a normalized schema for the data reported by the devices in Table 1.

tation. That is, because the different network devices/applications all use different date/time formats, the agents cannot simply report the date/time stamps reported by the device/application. Instead, the agents 12 may be configured to convert local date/time stamps to a universal date/time notation, such as Greenwich Mean Time.

In addition to normalizing event data by fields, agents 12 can parse the event data stream and set field values based on conventions and practices of the organization. For example, the variety of event severity levels that devices produce can all be normalized at the agent level into a single, consistent hierarchy.

Thus, agents 12 collect and process events generated by heterogeneous network devices/applications throughout an enterprise. Alerts can come from routers, e-mail logs, anti-virus products, firewalls, intrusion detection systems, access control servers, VPN systems, NT Event Logs, Syslogs, and other sources where security threat information is detected and reported. In some embodiments, each event generator has an agent 12 assigned to collect all relevant security information, while in other embodiments agents are shared among two or more event generators. Thus, depending on the device/application to be monitored and the in-place infrastructure, a choice is provided for simple log parsing and loading, network listening (e.g., through SNMP traps), installation on aggregation points (Syslog servers and concentrators) and full distribution to all security-relevant devices.

TABLE 2

Common Schema Representation of Event Data

| Date | Time | Event Name | Src_IP | Src_Port | Tgt_IP | Trg_Port | Device Type | Additional data |
|---|---|---|---|---|---|---|---|---|
| 21 Dec. 2001 | 12:10:29 | accept | 65.65.65.65 | 1355 | 10.10.10.10 | 80 | Check Point | |
| 21 Dec. 2001 | 12:10:27 | list 102 permitted tcp | 65.65.65.65 | 1355 | 10.10.10.10 | 80 | Cisco Router | |
| 21 Dec. 2001 | 12:10:28 | built inbound tcp connection | 65.65.65.65 | 1355 | 10.10.10.10 | 80 | Cisco PIX | |
| 21 Dec. 2001 | 12:10:29 | WEB-IIS ISAPI ·printer access | 65.65.65.65 | 1355 | 10.10.10.10 | 80 | Snort | TCP TTL:63 TOS:0x0 ID:5752 IpLen:20 DgmLen:1234 DF*AP* Seq: 0xB13810DC Ack: 0xC5D2E066 Win: 0x7D78 TcpLen: 32 TCP Options (3) =>NOP NOP TS: 493412860 0 |

Table 2 reports the same four events described earlier, this time in a normalized fashion. Each of the agents 12 is configured to extract the relevant data from events reported by its associated network device/application and map that data to the corresponding common schema representation. For instance the Check Point firewall reports a target port as www-http, not as port 80 as is the case for most other network devices. Therefore an agent 12 associated with the Check Point firewall is configured with an appropriate lookup mechanism (e.g., a table) to ensure that "www-http" as reported by the firewall gets translated into "port 80" when the agent 12 reports the event to the manager 14.

Similarly, the agents 12 may need to be configured to convert the date/time stamp formats used by the various network devices/applications into a common date/time represen- In addition to collecting and normalizing data from security devices, the agents 12 intelligently manage the data with:

Filtering: each agent 12 can be configured according to conditions by which data will be collected and sent to the manager 14. This helps to reduce the need to collect and manage large volumes of unwanted data.

Aggregation: Based on the time period selected, the agents 12 can collect duplicate alerts but send only a single message with a count of the total number of such alerts to the manager 14. This helps reduce the amount of traffic transmitted across the network.

Batching: Agents 12 can be configured to send a collection of alerts at one time rather than sending alerts immediately after each occurrence.

FIG. 2 illustrates the various processes performed by agents 12 from the point of view of the event information. Initially, at step 30, the raw event information is received or collected from the native network device or application in that device's/application's native format. At this point (or, optionally, following normalization), data filters may be applied to reduce the volume of data being passed for further analysis (step 32). Such filtering is optional and may involve assessing the captured data against one or more conditions to determine whether or not the data is relevant for further analysis.

Thereafter, the event data is normalized at step 34. As indicated above, the normalization may occur at the field and/or the field value level. Further, the normalization may involve translation of the field values into nomenclatures/formats used across an enterprise.

Following normalization, the event data may, optionally, be aggregated (step 36) before being transmitted to the manager 14 (step 38). The transmissions may occur as the events are captured or may be made on a batched basis. In either case, the messages used to transmit the event data preferably include all of the source fields of an event. By delivering the entire event data set (i.e., all of the source fields) organized in a consistent format (i.e., the common schema), powerful upstream data management, cross-correlation, display and reporting is available to the security team. In some embodiments the event data is discarded after successful transmission to the manager 14, but in other cases the data may be cached for a time at the agent 12 to permit later replay of the data.

Referring again to FIG. 1, the manager 14 includes one or more agent managers 26, which are responsible for receiving the event data messages transmitted by the agents 12. Where bi-directional communication with the agents 12 is implemented, these agent managers 26 may be used to transmit messages to the agents 12. If encryption is employed for agent—manager communications (which is optional), the agent manager 26 is responsible for decrypting the messages received from agents 12 and encrypting any messages transmitted to the agents 12.

Once the event data messages have been received (and if necessary decrypted), the event data is passed to the rules engine 18. Rules engine 18 is at the heart of the manager 14 and is used to cross-correlate the event data with security rules in order to generate meta-events. Meta-events, in the context of the present invention, are instances of (usually) multiple individual event data elements (gathered from heterogeneous sources) that collectively satisfy one or more rule conditions such that an action is triggered. Stated differently, the meta-events represent information gathered from different sensors and presented as correlated results (i.e., the decision output of the rules engine 18 indicating that different events from different sources are associated with a common incident as defined by one or more rules).

The actions triggered by the rules may include notifications transmitted (e.g., via notifier 24) to designated destinations (e.g., security analysts may be notified via the consoles 16, e-mail messages, a call to a telephone, cellular telephone, voicemail box and/or pager number or address, or by way of a message to another communication device and/or address such as a facsimile machine, etc.) and/or instructions to network devices (e.g., via agents 12 or via external scripts or programs to which the notifier 24 may pass arguments) to take action to thwart a suspected attack (e.g., by reconfiguring one or more of the network devices, and/or modifying or updating access lists, etc.). The information sent with the notification can be configured to include the most relevant data based on the event that occurred and the requirements of the analyst.

As discussed below, when meta-events are generated by the rules engine 18, on-screen notifications may be provided to consoles 16 to prompt users to open cases for investigation of the events which led to the notification. This may include accessing knowledge base 28 to gather information regarding similar attack profiles and/or to take action in accordance with specified procedures. The knowledge base 28 contains reference documents (e.g., in the form of web pages and/or downloadable documents) that provide a description of the threat, recommended solutions, reference information, company procedures and/or links to additional resources. Indeed, any information can be provided through the knowledge base 28. By way of example, these pages/documents can have as their source: user-authored articles, third-party articles, and/or security vendors' reference material.

The rules engine 18 is based on a RETE engine configured to pyeserve event information state over configurable time windows so as to provide correlation of the event data according to specified rules. Correlation is generally regarded as a process of bringing information items into mutual relation. In the context of the present invention, correlation through rules engine 18 provides the ability to access, analyze, and relate different attributes of events from multiple sources to bring something to the attention of an analyst that might (or likely would) have otherwise gone unnoticed. In other words, the rules engine 18 provides the ability to determine what type of incident is represented by a collection of events reported by a number of heterogeneous network devices and/or applications. Because the collected event data is normalized into a common event schema, correlation can be performed utilizing any field including, but not limited to, geography, device type, source, target, time thresholds, and/or event type. Based on alerts generated by the rules engine 18, operators are provided with a workflow for investigating these incidents.

Turning to FIG. 3, the manager 14 receives (step 40) and analyzes (step 42) the event data reported by agents 12 in real-time (or near real-time owing to network latencies and depending upon whether or not batched message transmission is used) according to a set of flexible rules. The rules define which events generate an alert, when those events generate an alert, and what actions are associated with the alert. Hence, the rules may be written to contain event conditions, thresholds, and actions. In some embodiments the rule conditions may be specified using Boolean operators and/or database queries. When incoming events match a particular rule's conditions and thresholds, causing a meta-event to be generated (step 44), the rule automatically fires the action that has been defined (step 46). Such actions can include, but are not limited to: executing a pre-determined command or script, logging the alert, sending the alert to the consoles 16, sending the alert to notification designees, setting custom severity levels for the alert based on cumulative activity, adding a source to a suspicious list or a target to a vulnerable list, and/or a combination of these actions.

Rules may be created at the manager 14 and/or at the consoles 16 using a flexible scripting language. An example of a rule might be:

If (an ids evasion attack) occurs (from the same source ip address) (3 times) within (2 minutes) then (send message to console) and (notify the security supervisor via pager).

In this example, the incoming event data would be compared against the rule conditions and thresholds (in the above example 3 events that satisfy the condition of an IDS evasion attack are required and all must originate from a common source IP address and be detected within 2 minutes of each other), and if those criteria are satisfied the designated actions (here, sending an alert message to the consoles 16 and also notifying a security supervisor via a pager) would be performed. The correlation rules that operate on the events evaluate threats and attacks according to selected criteria (e.g., degree of threat, level of success, vulnerability of target and value of target) and generate alerts according to a security intelligence taxonomy that focuses attention on the most dangerous and potentially most damaging attacks. For example, threats to network assets that are deemed not to have succeeded or that are not likely to succeed may be coded green, while those that have succeeded or have a high probability of success might be coded red. The value of the security information taxonomy lies in its ability to eliminate false positives while clearly identifying real threats to vulnerable and valuable assets.

In general, the rules may be designed to capture threats and attacks that are typical in large, diverse networks and may be organized to provide multiple lines of defense by detecting specific activities and grouping them according to level of threat:

Reconnaissance zone transfer, port scan, protocol, scanning, etc.

Suspicious illegal outgoing traffic, unusual levels of alerts from the same host, etc.

Attack overflow, IDS evasion, virus, denial of service, etc.

Successful compromise of a backdoor, root compromise, covert channel exploit, etc.

Similar events and signatures may be grouped into rule categories that can be utilized by the rules to insulate the rule from changes in vendor-specific event details. For example, event names may change between product releases or new devices may be added to the network infrastructure with a new set of nomenclature. Since the rule categories map similar signatures into a single name that is used by the rules engine, if an individual network device changes taxonomy, only the mapping is changed, not the rule definition. Therefore, despite changes in individual devices, the investment in custom defined rules is preserved.

After the events are processed by rules engine 18, the raw event data as well as any meta-events that were generated are stored in database 20 (step 48). In some embodiments, the raw event data may be stored prior to or concurrently with processing of the data by rules engine 18. Regardless of the sequence, such storage of the event data (and the meta-events generated by the rules engine 18) preserves a historical record of the event traffic and allows for replaying of the events through an existing or a new rule set (either at the manager 14 or the consoles 16) in order to assess the efficacy of new rules, for training purposes, and/or for case investigation.

Correlation via the rules ensures that credible threats and attacks come to the attention of the security staff on a high-priority basis. Hence once an alert is received, the operator can perform in-depth analysis and take aggressive action secure in the knowledge that the effort is well spent. When a rule match is reported to a console 16, the analyst can quickly drill down (through an associated graphical user interface) to see all of the individual events that caused the rule to fire. If necessary, the analyst can investigate even further to see all of the individual data elements captured for those events.

When action is required, the present invention provides a full set of tools and services for the operator. Resources such as the rule definition, a knowledge base article containing company policies and recommended actions, and the development of a complete case docket describing the problem assist the operator in responding immediately to critical security threats. If necessary, the operator can proactively deal with an attack by launching specific applications or scripts from the console 16 to reconfigure device settings or change access privileges.

Figure 4A:
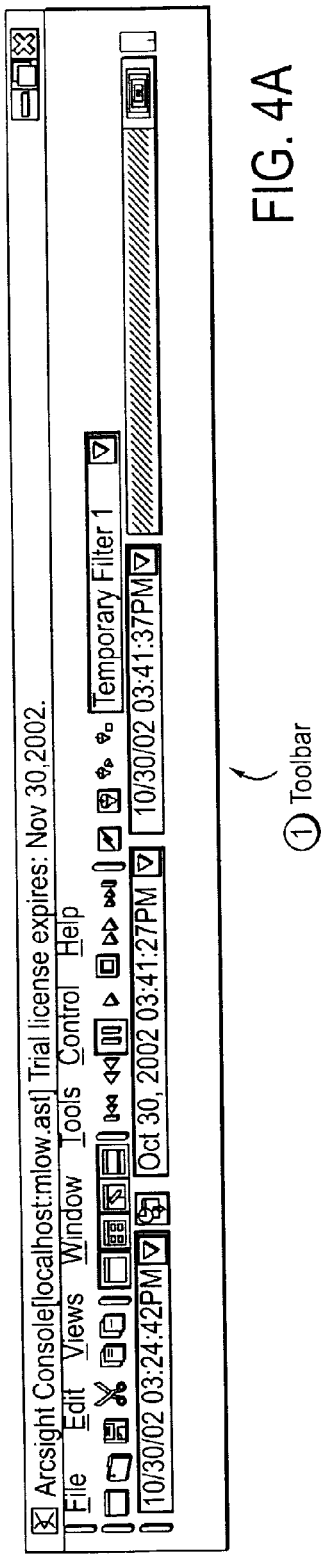
FIG. 4 illustrates one embodiment or a console for allowing a user to view security events from heterogeneous security devices, in accordance with the present invention.
Figure 4E:
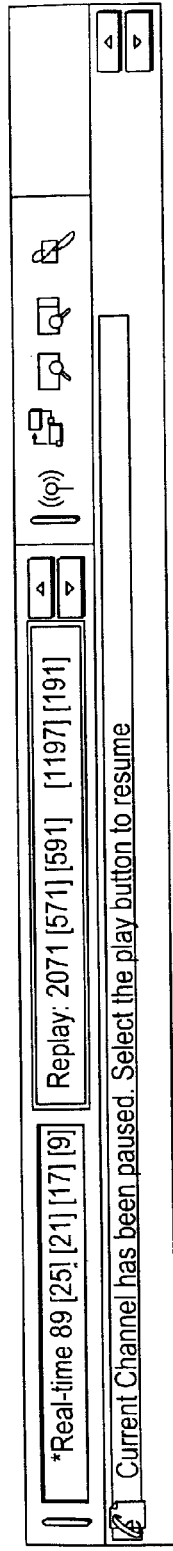
Figure 4B:
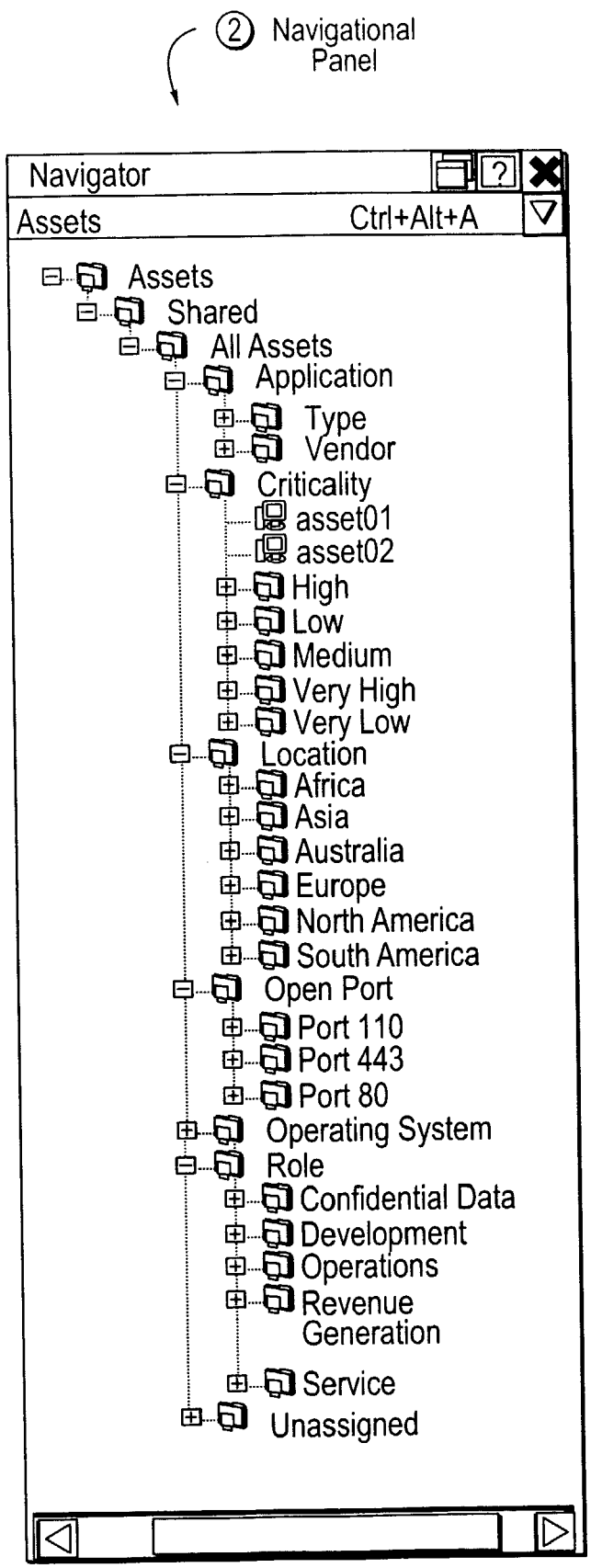

The console 16 provides a centralized view into the security status of an enterprise and gives administrators, analysts, and operators an interface to perform security management tasks. FIG. 4 illustrates one embodiment of a console 16 for allowing a user to view security events from heterogeneous security devices. Included in FIG. 4 is a Toolbar area 1 (illustrated in FIG. 4A), a Navigation Panel area 2 (illustrated in FIG. 4B), an Inspect/Edit panel area 3 (illustrated in FIG. 4C), a viewers panel area 4 (illustrated in FIG. 4D), and a status bar area 5 (illustrated in FIG. 4E). Console 16 is a graphical user interface (GUI) that can be run in Windows™, Linux™, Apple™, Palm™ or similar operating environments. Furthermore, console 16 can be executed as an independent software application in the aforementioned operating environments or also be web enabled via a web browser such as Internet Explorer™ or Netscape Navigator™. FIG. 4A illustrates one embodiment of a toolbar of the console illustrated in FIG. 4, in accordance with the present invention. Area 1 is a toolbar area, which contains a standard file menu area. Additionally, area 1 includes playback controls that will be described in greater detail below with reference to FIG. 5. FIG. 4B illustrates one embodiment of a navigation panel of the console illustrated in FIG. 4, in accordance with the present invention. Area 2 is a navigation panel that allows a user to view and manipulate all system resources (i.e., assets, active lists, zones, cases, etc.) in an organized and centralized manner. The resources can be organized into categories such as by application, criticality, location, open port numbers, operating systems, system role, and similar categorizations. Each of these categories can have subcategories, and those subcategories can have additional subcategories, so on and so forth. A user can drill down through all subcategories until a desired asset is reached and viewed. Once selected, all events for that asset can be viewed, managed and manipulated via console 16.

Figure 4C:
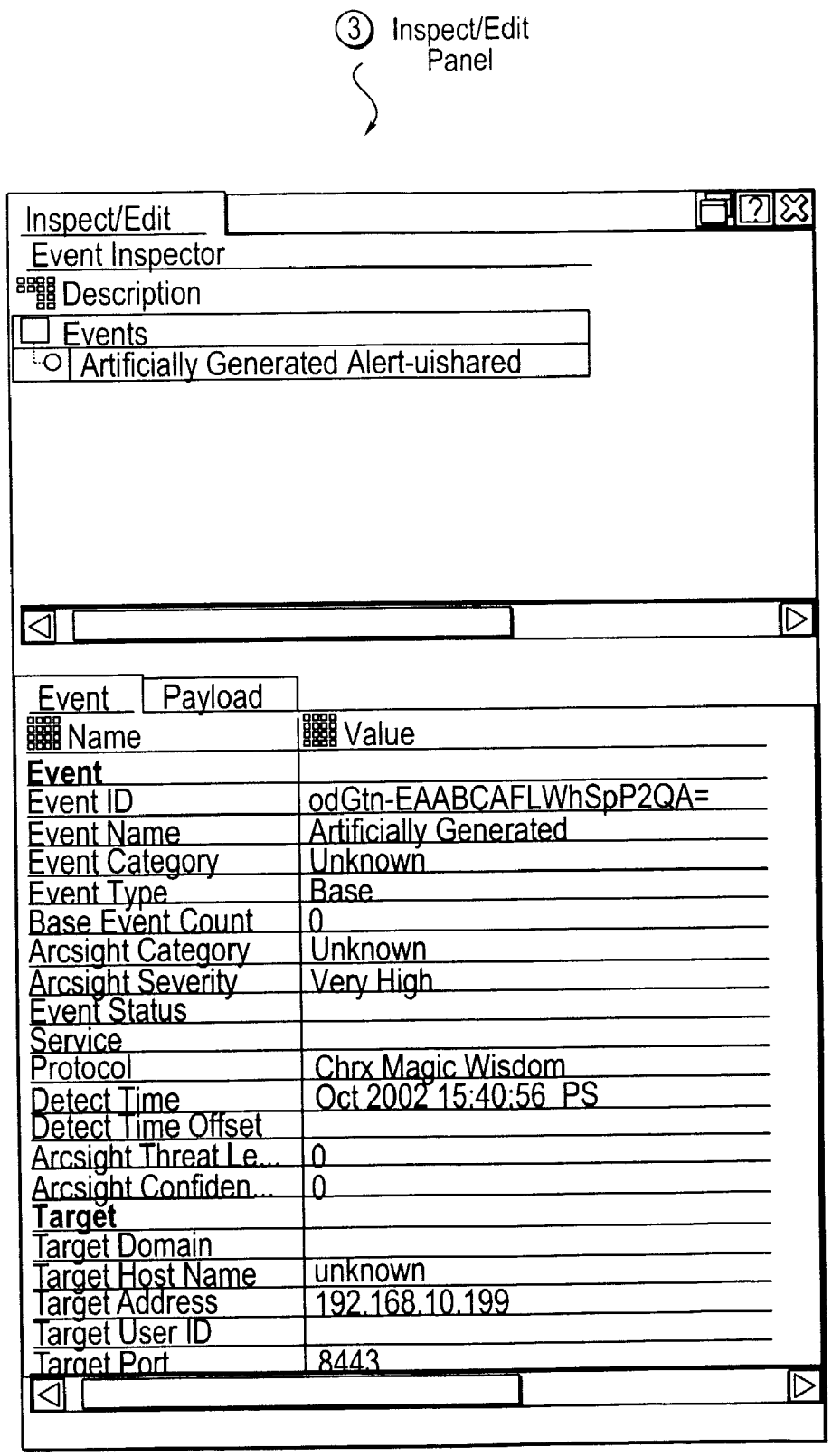

FIG. 4C illustrates one embodiment of an inspection/editing panel of the console illustrated in FIG. 4, in accordance with the present invention. Area 3 is an inspect/edit panel through which a user can examine a specific event in great detail. The details of the event displayed include an event name, ID, Category, Type, Severity, Status, Base event count, service type, protocol, detection time and threat levels. Additional details are provided about the target device of which the event pertains. These additional details include the target's domain, host name, address, user ID, and port. Thus, as alluded to above console 16 provides operators with complete drill-down capability from the highest level of detail (e.g., the entire range of events) to the lowest level of detail (e.g., fields within a single event). This allows analysts to probe at whatever level of detail is required to gain further insight into an attack and assess vulnerability. This varying level of detailed analysis is made possible because the agents 12 report all of the event data fields, not merely a subset thereof. By way of example, one tool provides analysts with the ability to quickly see similar characteristics of events using a cursor control operation, such as a mouse click. For example, if analysts are presented with a meta-event alert that consists of, say, twenty or more individual events reported by several different agents associated with different network devices, the present user interface associated with consoles 16 allows the analyst to quickly visualize only the common fields of these events (e.g., such as a source IP address) by simply highlighting the events and performing a mouse click/select operation.

Figure 4D:

FIG. 4D illustrates one embodiment of a viewers panel of the console illustrated in FIG. 4, in accordance with the present invention. Also included in control panel 16 is area 4 which is a views panel 4. Views panel 4 allows a user to view security events from heterogeneous sources. The functionality and layout of views panel 4 will be discussed in greater detail below with reference to FIG. 6. FIG. 4E illustrates one embodiment of a status bar of the console illustrated in FIG. 4, in accordance with the present invention. Finally, area 5 is a status bar that describes the current state of the time-based events selected by a user. Status Bar 5 indicates whether the event being examined is being replayed from a database or being provided to the user in real-time. All areas of console 16 are user configurable and customizable. In various embodiments, the console 16 provides event display in real-time or in replay mode (i.e., the ability to playback events from a given time period according to a VCR or DVD metaphor). Replay may be generated from the events stored in database 20 or, in some instances, from caches associated with agents 12. This latter form of replay is especially useful because it provides improved simulation of actual network conditions as the events are played out across the same network as during the original attack.

Figure 5:
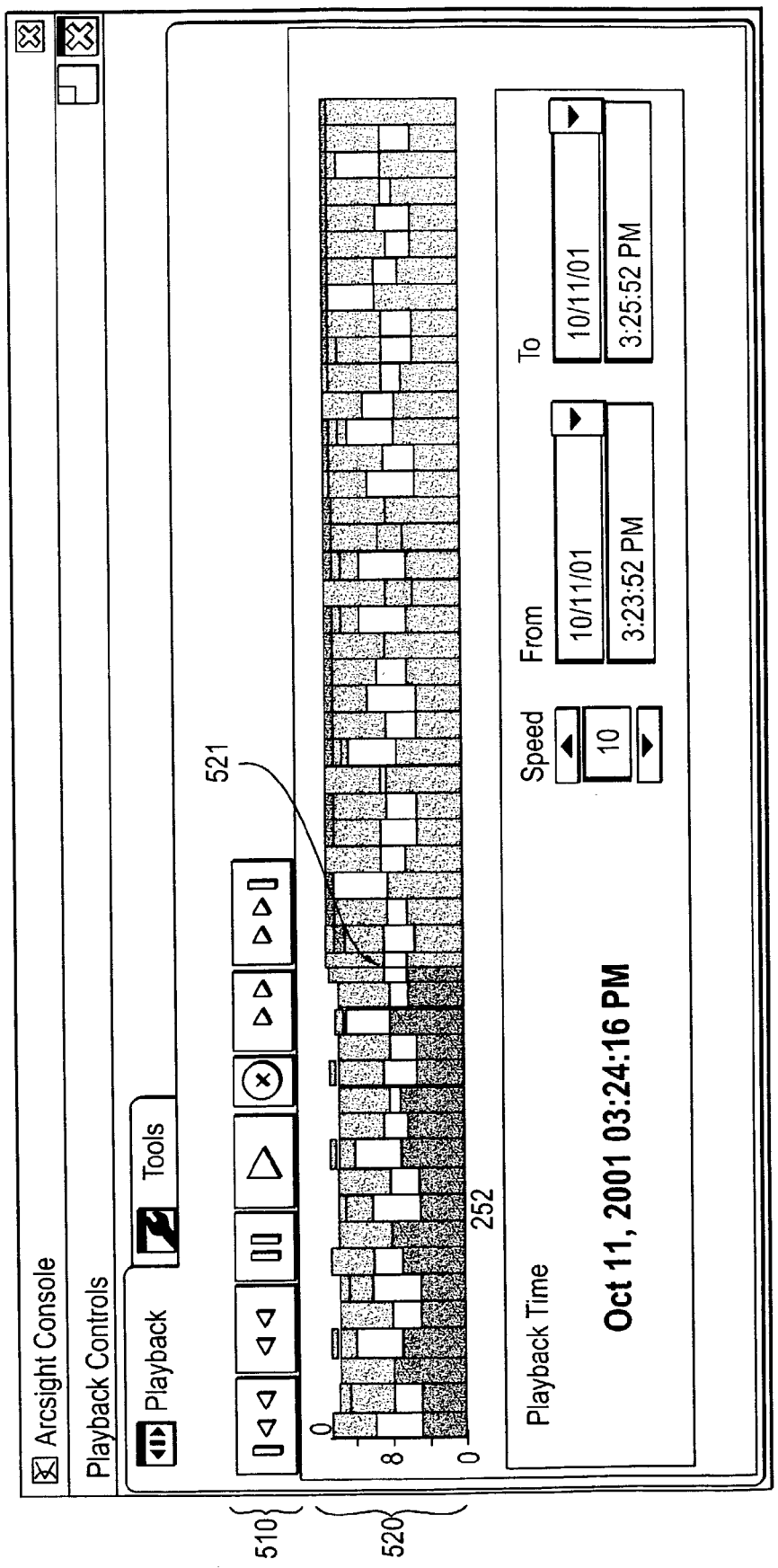
FIG. 5 illustrates one embodiment of playback controls including VCR controls and a radar display in accordance with the present invention.

As discussed above, Toolbar 1 includes playback controls. FIG. 5 illustrates one embodiment of playback controls 500 including VCR controls 510 and radar 520. Rather than providing a list of events in response to query, playback controls allows a user to simulate the events as they occurred in time. The events are played back over a user specified time period with a specified speed factor. The speed factor is selected by the user in the "speed" box to either speed up or slow down playback. The user-specified time period (including a date range) can be entered in the "From" and "To" boxes. The exact time and date of the event is provided to the user in the "Playback Time" box.

After selecting the time period the user wishes to playback, using VCR controls 510, the user can play, stop, pause, rewind, fast forward, jump to the beginning of the stream and jump to the end of a playback stream. These functions are extended to a real-time (i.e., live) event stream as well, with the limitation that a user cannot forward the stream beyond the current time into the future. In addition to analyzing events in real-time and replay, a user has the option to monitor events in a query mode and replay with rules mode. These additional modes are used to test the security of the system and test the efficiency of user-defined rules.

Additionally, playback control 500 includes radar 520. Radar 520 is an event distribution graph for a user-defined time period. Radar 520 includes vertical bars that indicate a volume of events and is color-coded to indicate the severity of the events described by the graph, as described above. In alternate embodiments, radar 520 can be color coded by other attributes such as target port, event category, or similar attributes. Specific bars can be selected and blown up to show greater detail of those events. In order to show the time at which the events occurred, radar 520 includes slider 521. With slider 521, a user can go to any point in time represented on the radar by sliding the slider 521 over the point in time on the graph. Users can virtually detect time-based event patterns.

As the slider 521 moves across the radar display 520, events are populated in the views panel 4 in correlation to the slider's 521 movement. The slider can be moved, expanded, or narrowed to select which events are populated in the views panel 4, which will be described now. FIG. 6 illustrates one embodiment of a views panel 4 that is a grid display 600 in accordance with the present invention. Grid display 600 shows events 650 chronologically from 22:58:50 PDT to 22:58:52 PDT on Oct. 11, 2001. Similar to a spreadsheet, columns detailing the detection time 610, classification name 620, source node address 630 and target node address 640 are all displayed. The events 650 are also color coded in rows to identify their individual severities. As described above, the events 650 can be moved, expanded, narrowed, and populated in cooperation with playback controls 500.

Grid display 600 is one view that a user can select to be presented with events 650. Console 16 is architected so that developers can easily build views that allow for different visualizations of data. For example, three-dimensional views can be developed and plugged into console 16. FIG. 6 indicates that besides a grid view display 600 being available, a user can select the Pie Chart tab and display a Pie Chart View Display. Additional views can be used as will be described now in connection with FIG. 7.

Figure 7A:
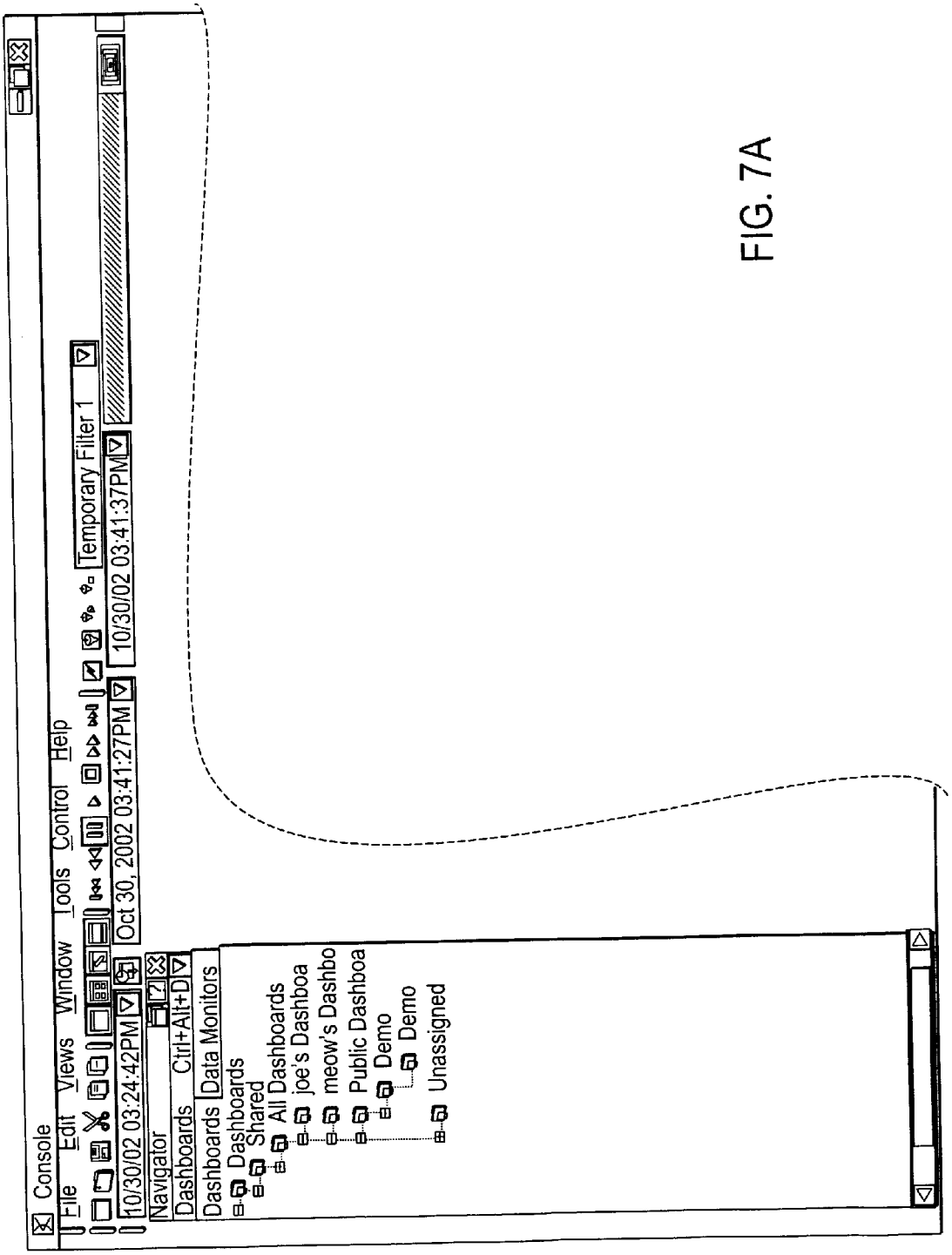
FIG. 7 illustrates one embodiment of a views panel, that shows a multitude of views including bar graphs and pie charts in accordance with the present invention.
Figure 7B:
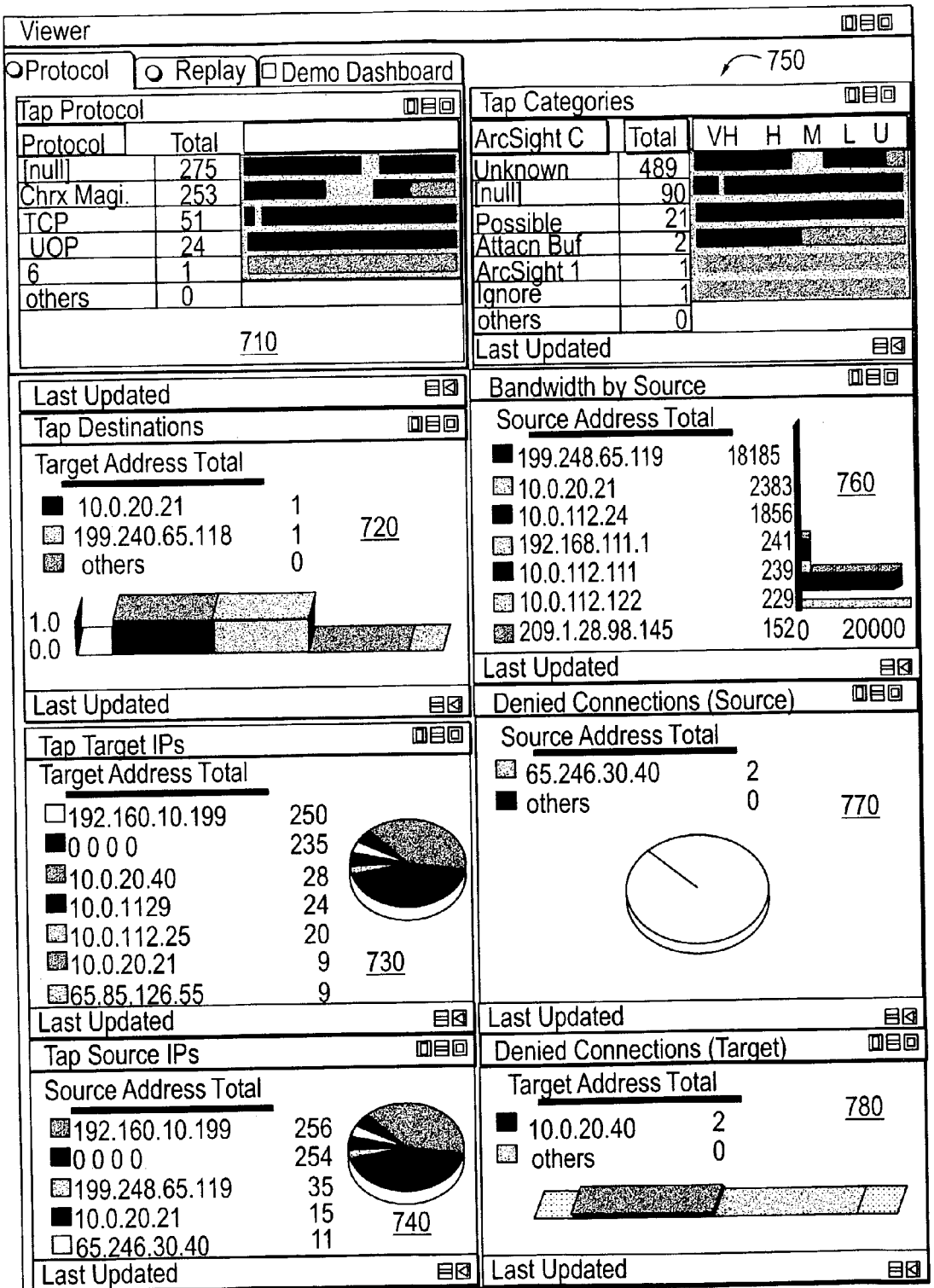
Figure 7C:
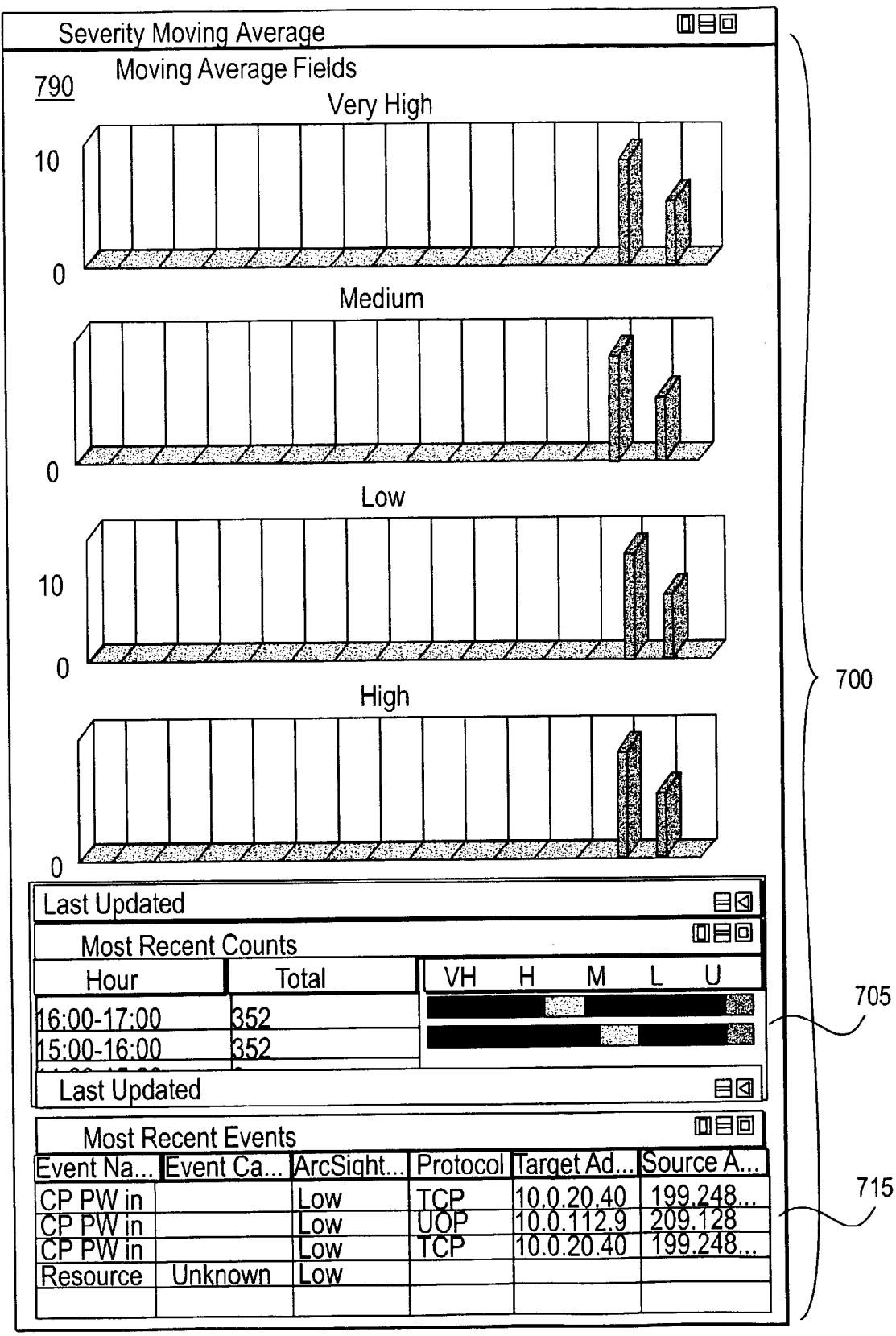

FIG. 7 illustrates one embodiment of a views panel, that shows a multitude of views including bar graphs and pie charts in accordance with the present invention. FIG. 7A illustrates one embodiment of a first portion of the views panel illustrated in FIG. 7. FIG. 7B illustrates one embodiment of a second portion of the views panel illustrated in FIG. 7. FIG. 7C illustrates one embodiment of a third portion of the views panel illustrated in FIG. 7. View display 700 illustrated in FIG. 7A and FIG. 7B includes views displaying tap protocol 710, Tap destinations 720, Tap Target IPs 730, Tap source IPs, Tap Categories 750, Bandwidth by source 760, Denied Connections by Source 770, Denied Connections by Target 780, and Moving Average of Severity 790. In addition for the most recent counts 705 and most recent events 715. Thus, console 16 provides for a wide variety of views, that allow administrators, and security personnel an intuitive interface to perform essential security management tasks.

Though there are varying information types and degrees of information gathered from devices, the information is normalized, contained, and stored as data fields, for consistent investigative and analytical comparison of all events, regardless of the device.

Once security personnel have been notified of an event, they can utilize the knowledge base to determine the appropriate actions. In addition, security analysts may undertake investigations of events and/or meta-events. In general, such matters can be assigned to so-called cases. Stated differently, cases create a workflow and oversight environment for situations where there are suspicious events requiring further investigation. Once a case is created, it can be assigned to an operator, investigated, and resolved based on the business policies and practices of the enterprise (e.g., as documented in knowledge base 28). The security staff can also add narration and event information to a case, or view open cases to determine their status and any required next steps.

Consoles 16 also provide a front-end for the administration of the entire system 10. This may include system configuration such as setting up operators, notification, agent behavior, etc. User management (such as creating and modifying users, access, roles, and responsibilities), rules management (e.g., authoring, viewing, and updating rules), and workflow management (e.g., setting up the flow of actions taken when an event is received) may also be handled through the consoles 16. Finally, the consoles 16 allow for remote access, thus supporting divisional responsibility and "follow-the-sun" management.

Thus, a computer-based system for capturing, correlating and reporting security events from heterogeneous sources has been described. More specifically, included in the system is a user interface for a network security console that is associated with the heterogeneous sources. In the foregoing description, the various examples and embodiments were meant to be illustrative of the present invention and not restrictive in terms of their scope. Accordingly, the invention should be measured only in terms of the claims, which follow.

What is claimed is:

1. A computer-implemented method for displaying information regarding time-based security events, the method comprising:
separating the events into sets, wherein a set includes events associated with a time period;
dividing the set of events into groups, wherein a group includes events that have a same value for a same attribute; and
displaying a user interface comprising:
a bar graph comprising:
a first axis that represents a volume of events;
a second axis that represents time; and
multiple bars, wherein a bar represents a set of events associated with a time period, and wherein the bar is divided into multiple portions, and wherein each portion represents a group of events having a same value for a same attribute, and wherein a first portion has a different visual appearance than a second portion; and
a user-manipulable control element that indicates a time span.

2. The method of claim 1, wherein the same attribute is severity.

3. The method of claim 1, wherein the same attribute is target port.

4. The method of claim 1, wherein the same attribute is category.

5. The method of claim 1, wherein widening the user-manipulable control element lengthens the time span.

6. The method of claim 1, wherein narrowing the user-manipulable control element shortens the time span.

7. The method of claim 1, wherein moving the user-manipulable control element shifts the time span.

8. The method of claim 1, wherein the user interface further comprises a view panel that displays information regarding a plurality of events, wherein each event in the plurality is associated with the time span indicated by the user-manipulable control element.

9. The method of claim 8, wherein the view panel comprises a pie chart.

10. The method of claim 9, wherein the pie chart represents the plurality of events, and wherein a sector of the pie chart represents events with a same value of a same attribute.

11. The method of claim 8, wherein the view panel comprises a table.

12. The method of claim 11, wherein a row of the table represents an event and wherein a column of the table represents an attribute of an event.

13. The method of claim 12, wherein a color of the row is based on a value of the attribute of the event represented by the row.

14. The method of claim 8, wherein the view panel comprises a bar graph.

15. The method of claim 1, wherein the user interface further comprises an indication of a start date and an indication of an end date, wherein the start date represents a date of the beginning of the time period and wherein the end date represents a date of the end of the time period.

16. The method of claim 1, wherein the user interface further comprises an indication of a start time and an indication of an end time, wherein the start time represents the beginning of the time period and wherein the end time represents the end of the time period.

17. The method of claim 1, wherein an event was generated by either a security device or a security application.

18. The method of claim 1, wherein a first event of the set of events was generated by a first source, and wherein a second event of the set of events was generated by a second source.

19. The method of claim 1, wherein the bar is vertical.

20. The method of claim 1, wherein the first portion is colored differently than the second portion.

21. A computer program product for displaying information regarding time-based security events, the computer program product comprising a computer-readable medium storing instructions that, when executed by a processor, cause the processor to perform a method, the method comprising:
separating the events into sets, wherein a set includes events associated with a time period;
dividing the set of events into groups, wherein a group includes events that have a same value for a same attribute; and
displaying a user interface comprising:
a bar graph comprising:
a first axis that represents a volume of events;
a second axis that represents time; and
multiple bars, wherein a bar represents a set of events associated with a time period, and wherein the bar is divided into multiple portions, and wherein each portion represents a group of events having a same value for a same attribute, and wherein a first portion has a different visual appearance than a second portion; and
a user-manipulable control element that indicates a time span.

22. A system for displaying information regarding time-based security events, the system comprising a processor configured to perform a method, the method comprising:
separating the events into sets, wherein a set includes events associated with a time period;
dividing the set of events into groups, wherein a group includes events that have a same value for a same attribute; and
displaying a user interface comprising:
a bar graph comprising:
a first axis that represents a volume of events;
a second axis that represents time; and
multiple bars, wherein a bar represents a set of events associated with a time period, and wherein the bar is divided into multiple portions, and wherein each portion represents a group of events having a same value for a same attribute, and wherein a first portion has a different visual appearance than a second portion; and
a user-manipulable control element that indicates a time span.

* * * * *

UNITED STATES PATENT AND TRADEMARK OFFICE
CERTIFICATE OF CORRECTION

| | | |
|---|---|---|
| PATENT NO. | : 7,607,169 B1 | Page 1 of 1 |
| APPLICATION NO. | : 10/308418 | |
| DATED | : October 20, 2009 | |
| INVENTOR(S) | : Njemanze et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1934 days.

Signed and Sealed this

Twelfth Day of October, 2010

David J. Kappos
*Director of the United States Patent and Trademark Office*